United States Patent
Srinivasan

(10) Patent No.: US 6,489,070 B1
(45) Date of Patent: Dec. 3, 2002

(54) PHOTOCONDUCTORS COMPRISING CYCLIC CARBONATE POLYMERS

(75) Inventor: Kasturi R. Srinivasan, Longmont, CO (US)

(73) Assignee: Lexmark International, Inc., Lexington, KY (US)

(*) Notice: Subject to any disclaimer, the term of this patent is extended or adjusted under 35 U.S.C. 154(b) by 40 days.

(21) Appl. No.: 09/802,595

(22) Filed: Mar. 9, 2001

(51) Int. Cl.[7] .................................................. G03G 5/05
(52) U.S. Cl. ........................ 430/58.5; 430/96; 430/133
(58) Field of Search ........................ 430/96, 133, 59.1, 430/59.5

(56) References Cited

U.S. PATENT DOCUMENTS

| | | | |
|---|---|---|---|
| 4,717,636 A | 1/1988 | Takahashi et al. | 430/58 |
| 4,734,348 A | 3/1988 | Suzuki et al. | 430/96 |
| 4,752,549 A | 6/1988 | Otsuka et al. | 430/58 |
| 4,888,411 A * | 12/1989 | Shannon et al. | 528/199 |
| 5,130,215 A | 7/1992 | Adley et al. | 430/58 |
| 5,288,575 A | 2/1994 | Kashizaki et al. | 430/58 |
| 5,302,694 A | 4/1994 | Buchholz | 528/354 |
| 5,357,028 A | 10/1994 | Pakull et al. | 528/196 |
| 5,378,567 A | 1/1995 | Nozomi et al. | 430/58 |
| 5,391,693 A | 2/1995 | Nakae | 528/201 |
| 5,453,342 A | 9/1995 | Go et al. | 430/58 |
| 5,521,041 A | 5/1996 | Miyamoto et al. | 430/58 |
| 5,529,869 A | 6/1996 | Nguyen et al. | 430/78 |
| 5,545,499 A | 8/1996 | Balthis et al. | 430/59 |
| 5,571,648 A | 11/1996 | Mishra et al. | 430/67 |
| 5,693,722 A * | 12/1997 | Priddy et al. | 525/439 |
| 5,834,147 A | 11/1998 | Nagae et al. | 430/67 |
| 5,932,384 A | 8/1999 | Mitsumori et al. | 430/59 |
| 5,942,363 A | 8/1999 | Tanaka et al. | 430/75 |
| 6,066,428 A | 5/2000 | Katayama et al. | 430/73 |
| 6,087,055 A | 7/2000 | Niimi | 430/58.7 |
| 6,187,494 B1 * | 2/2001 | Kawamura et al. | 430/96 |

OTHER PUBLICATIONS

Mandal et al, *Synthesis, Characterization and Crosslinking Study of Some Novel Polycyclic Carbonates of 4–alkyl Substituted Pehnol–Formaldehyde Resin*, Am. Chem. Soc. Div. Polym. Chem., 38(2):193–194 (1997).

Mandal et al, *High Perform. Polym.*, 9:215–227 (1997).

* cited by examiner

Primary Examiner—John Goodrow

(57) ABSTRACT

A photoconductor comprises a substrate and a charge generation layer comprising cyclic carbonate polymer and a charge generation molecule. The photoconductor exhibits improved electrical characteristics.

30 Claims, No Drawings

PHOTOCONDUCTORS COMPRISING CYCLIC CARBONATE POLYMERS

FIELD OF INVENTION

The present invention is directed toward photoconductors and compositions used to form photoconductors. More particularly, the invention is directed towards photoconductors comprising a substrate and a charge generation layer, wherein the charge generation layer comprises a cyclic carbonate polymer. The invention is further directed toward methods of improving electrical characteristics of photoconductors, and methods of improving the stability of photoconductors, as well as binder blends comprising a cyclic carbonate polymer.

BACKGROUND OF THE INVENTION

In electrophotography, a latent image is created on the surface of an imaging member such as a photoconducting material by first uniformly charging the surface and then selectively exposing areas of the surface to light. A difference in electrostatic charge density is created between those areas on the surface which are exposed to light and those areas on the surface which are not exposed to light. The latent electrostatic image is developed into a visible image by electrostatic toners. The toners are selectively attracted to either the exposed or unexposed portions of the photoconductor surface, depending on the relative electrostatic charges on the photoconductor surface, the development electrode and the toner.

Typically, a dual layer electrophotographic photoconductor comprises a substrate such as a metal ground plane member on which a charge generation layer (CGL) and a charge transport layer (CTL) are coated. The charge transport layer contains a charge transport material which comprises a hole transport material or an electron transport material. For simplicity, the following discussions herein are directed to use of a charge transport layer which comprises a hole transport material as the charge transport compound. One skilled in the art will appreciate that if the charge transport layer contains an electron transport material rather than a hole transport material, the charge placed on a photoconductor surface will be opposite that described herein.

When the charge transport layer containing a hole transport material is formed on the charge generation layer, a negative charge is typically placed on the photoconductor surface. Conversely, when the charge generation layer is formed on the charge transport layer, a positive charge is typically placed on the photoconductor surface. Conventionally, the charge generation layer comprises the charge generation compound or molecule, for example a squaraine pigment, a phthalocyanine, or an azo compound, alone or in combination with a binder. The charge transport layer typically comprises a polymeric binder containing the charge transport compound or molecule. The charge generation compounds within the charge generation layer are sensitive to image-forming radiation and photogenerate electron-hole pairs therein as a result of absorbing such radiation. The charge transport layer is usually non-absorbent of the image-forming radiation and the charge transport compounds serve to transport holes to the surface of a negatively charged photoconductor. Photoconductors of this type are disclosed in the Adley et al, U.S. Pat. No. 5,130,215 and the Balthis et al, U.S. Pat. No. 5,545,499.

Various polymers are known for use in charge generation and/or charge transport layers. For example, polycarbonate resins, including aromatic polycarbonate resins, are taught in U.S. Pat. Nos. 5,378,567, 5,942,363, and 6,066,428, for use in photoconductors. Miyamoto et al., U.S. Pat. No. 5,521,041, teach an electrophotographic photoreceptor comprising an electroconductive substrate and a photosensitive layer wherein the photosensitive layer comprises a polycarbonate. Miyamoto et al. teach the polycarbonate may be prepared by allowing a dihydric phenol to react with a carbonate precursor, such as phosgene, in the presence of an end terminator.

While the charge transport layers and charge generation layers of photoconductors generally comprise binders, the electrical sensitivity of a charge generation layer can be detrimentally affected by the polymer binders. For example, the use of polyvinylbutyral as a charge generation layer binder is advantageous in that it significantly improves adhesion of the charge generation layer to the substrate. Unfortunately, polyvinylbutyral can disadvantageously affect electrical characteristics of the resulting photoconductor in causing, inter alia, high dark decay and residual voltage properties. Polycarbonates have been known to improve the mechanical properties of a photoconductor, particularly impact resistance.

Thus, there is a need for binder and binder blends for use in charge generation layers which provide the photoconductors with good mechanical properties without significantly decreasing electrical sensitivity of photoreceptors.

SUMMARY OF THE INVENTION

Accordingly, it is an object of this invention to obviate various problems of the prior art. It is another object of this invention to provide photoconductors having good electrical characteristics, particularly good electrical sensitivity.

It is a further object of this invention to provide photoconductors which have reduced dark decay and/or improved print stability and fatigue characteristics, and/or which charge and discharge in a very short time. It is yet another object of this invention to provide binder blends which do not compromise the adhesion of coatings onto substrates.

In one embodiment, the invention is directed to photoconductors comprising a substrate and a charge generation layer comprising a cyclic carbonate polymer.

In accordance with another embodiment, the invention, is directed to methods of improving an electrical characteristic of a photoconductor. The methods comprise forming a photoconductor comprising a substrate and a charge generation layer comprising a charge generation molecular and a cyclic carbonate polymer.

In accordance with a further embodiment aspect of the invention there are provided methods of improving the stability of a photoconductor comprising a charge generation layer comprising a charge generation molecule and polyvinylbutyral, the method comprising the step of adding to the charge generation layer a cyclic carbonate polymer. In accordance with yet another embodiment of the invention there are provided charge generation layer-forming compositions comprising pigment, solvent and a binder blend, wherein the binder blend comprises polyvinylbutyral and a cyclic carbonate polymer.

In accordance with one embodiment of the invention, there are provided binder blends comprising a first binder selected from the group consist of cyclic carbonate polymers and mixtures thereof, and a second binder which is other than a cyclic carbonate polymer.

Photoconductors comprising charge generation layers in accordance with the present invention have good electrical characteristics, particularly good electrical sensitivity, low dark decay and/or stable fatigue through life. Further, in various embodiments, the photoconductors charge and discharge at a very short time interval, and thus are useful for high speed printing in the range of from about 30 to about 50 pages per minute.

These and additional objects and advantages will become more fully apparent in view of the following description.

DETAILED DESCRIPTION

The charge generation layers according to the present invention are suitable for use in dual layer photoconductors. Such photoconductors generally comprise a substrate, a charge generation layer (CGL) and a charge transport layer (CTL). The photoconductors may also comprise a sub-layer to assist in the adhesion of the charge generation and charge transport layers, or a protective coating to reinforce the durability of the charge generation and charge transport layers. Some substrates, such as aluminum, may be anodized. In one embodiment the substrate is anodized aluminum or aluminized MYLAR®. While various embodiments of the invention discussed herein refer to the charge generation layer as being formed on the substrate, with the charge transport layer formed on the charge generation layer, it is equally within the scope of the present invention for the charge transport layer to be formed on the substrate with the charge generation layer formed on the charge transport layer.

The present invention is directed toward photoconductors comprising a charge generation layer wherein the charge generation layer comprises a cyclic carbonate, as well as to charge generation compositions used to form such photoconductors. Photoconductors comprising a charge generation layer (CGL) in accordance with the present invention exhibit improved electrical characteristics such as improved photosensitivity, reduced dark decay, and/or reduced fatigue.

As used herein, "charge voltage" refers to the voltage applied on a drum by a charge roll or corona. "Discharge voltage" refers to the voltage on the drum after shining light on the drum. Discharge voltage may be measured at several different light energies. Whereas the streak voltage corresponds to the voltage measured at lower laser light energy (about 0.2 microjoules/cm$^2$), the discharge voltage (also referred to as residual voltage) corresponds to voltage at higher laser energy.

Photoconductor drums may exhibit a loss of charge in the dark, i.e., may lose some charge before a light source discharges the charge. As used herein, "dark decay" refers to the loss of charge from the surface of a photoconductor when it is maintained in the dark. Dark decay is an undesirable feature as it reduces the contrast potential between image and background areas, leading to washed out images and loss of gray scale. Dark decay also reduces the field that the photoconductive process will experience when light is brought back to the surface, thereby reducing the operational efficiency of the photoconductor.

As used herein, "fatigue" refers to the tendency for a photoconductor to exhibit increases (negative) or decreases (positive) in its discharge voltage. Fatigue is undesirable as it reduces the development factor resulting in light or washed out print or dark print, as well as print that varies from page to page.

As used herein, "sensitivity" or "photosensitivity" refers to the ability of a photoconductor to discharge its voltage efficiently. The photosensitivity may be measured as the amount of light energy, in microjoules/cm$^2$, required to reduce the photoconductor's voltage from its initial charge to a lower charge. The photoconductors may be subjected to sensitivity measurements using a sensitometer fitted with electrostatic probes to measure the voltage magnitude as a function of light energy shining on the photoconductor surface. It is undesirable for a photoconductor to have poor sensitivity for such a photoconductor would require a large amount of light energy to discharge its voltage.

Additionally, the present invention is directed toward compositions used to form CGLs, referred to as charge generation layer-forming compositions. Photoconductors of the present invention comprise a substrate and a charge generation layer formed from a charge generation layer-forming composition. The charge generation composition comprises a cyclic carbonate polymer, preferably the charge composition comprises a binder blend of a cyclic carbonate polymer and a binder other than a cyclic carbonate. Suitable binders conventionally employed in the art, include, but are not limited to, vinyl polymers such as polyvinylchloride, polyvinylbutyral and polyvinylacetate; polycarbonate polymers and copolymers other than cyclic carbonates, including polyester carbonates; acrylic resins; polyamides; polyacrylamides; polyurethanes; butyral resins, epoxy resins and phenolic resins. Preferably the binder blend comprises a cyclic carbonate polymer and a polyvinylbutyral.

Cyclic Carbonate Polymers

As used herein, cyclic carbonate polymers are polymers comprising a carbonate in the form of a cyclic moiety. As used herein, cyclic carbonate polymers do not refer to polycarbonates which comprise a phenol ring or a cycloalkyl compound wherein the phenol ring or cycloalkyl compound do not comprise a section of the cyclic carbonate moiety. For example, poly (p-octylphenol-formaldehyde) and polycarbonate-A comprise phenol groups, however, these groups are not part of a cyclic carbonate moiety, and these compounds are not considered to be cyclic carbonate polymers as defined and used herein.

Cyclic carbonates have the general structure:

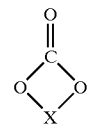

I wherein X comprises at least one carbon atom, preferably from about 3 to about 5 carbon atoms. In one embodiment, X has the structure:

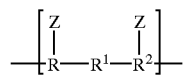

II wherein R and R$^2$ are CH or a substituted or unsubstituted aryl ring, and R$^1$ is (CH$_2$)$_n$ wherein n is at least about 1, preferably from about 1 to about 3, and wherein Z indicates a bond to a carbon in a polymer chain.

Suitable cyclic carbonate polymers may comprise the moieties:

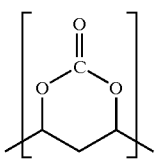

III or

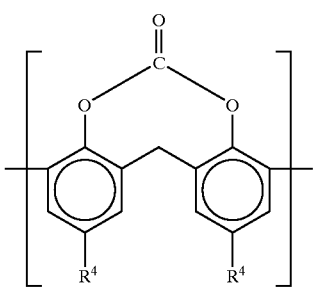

IV or mixtures thereof, wherein each $R^4$ is independently selected from the group consisting of hydrogen, aryl groups, and alkyl groups, preferably alkyl groups having from about 4 to about 8 carbon atoms.

Cyclic carbonate polymers may be prepared by reacting hydroxy-containing polymers with carbonyl-donating compounds. Generally the weight ratio of hydroxy-containing polymer to carbonyl-donating compound is from about 6:1 to about 1:1, preferably from about 1:1 to about 3:1. Carbonyl-donating compounds include phosgene compounds such as phosgene, triphosgene, diphosgene, bromophosgene, bis (2,4,6-trichlorophenol) carbonate, bis (2,4-dichlorophenol) carbonate and bis (2-cyanophenol) carbonate. A preferred carbonyl-donating compound is triphosgene (bis (trichloromethyl) carbonate). Preferred cyclic carbonates include carbonates derived from polyvinylbutyral polymers or copolymers, such as poly(vinylbutyral-vinylalcohol-vinylacetate) resin, and phenol-formaldehyde resins, such as 4-t-butylphenol-formaldehyde, 4-phenylphenol-formaldehyde, poly(p-octylphenol-formaldehyde), poly(bisphenol-A-co-formaldehyde), and poly(bisphenol-A-co-formaldehyde-co-butylphenol).

The synthesis of cyclic carbonate polymers may be carried out in a manner similar to that reported by H. Mandal and A. S. Hay, *Polym. Prepr. Am. Chem. Soc., Div. Polym. Chem.* 38(2), 1993–1994 (1997), and H. Mandal and A. S. Hay, *High Perform. Polym.,* 9, 215–227 (1997) incorporated herein by reference. For example, a hydroxy-containing polymer, such as a polyvinylbutyral resin or a phenol-formaldehyde resin, may be reacted with a carbonyl-donating compound, such as triphosgene, in the presence of a solvent, such as tetrahydrofuran, and, optionally, an acid scavenger, such as pyridine.

While not being bound by theory, it is believed that the reaction of a poly (vinylbutyral-vinyl acetate-vinyl alcohol) (PVB), may form both a soluble polymer and an insoluble polymer. It is believed that in some embodiments the PVB resin may have a hydroxyl content of about 30%, and that both intra and interchain condensation with the triphosgene may occur resulting in either an insoluble (cross-linked) or soluble (intra-chained) polymer. A mixture of both the soluble and insoluble polymer may be used in the formation of the charge generation compound and resulting charge generation layer. While not being bound by theory, the reaction of the polyvinylbutyral and triphosgene is believed to proceed as set forth below in Reaction Sequence 1.

REACTION SEQUENCE 1

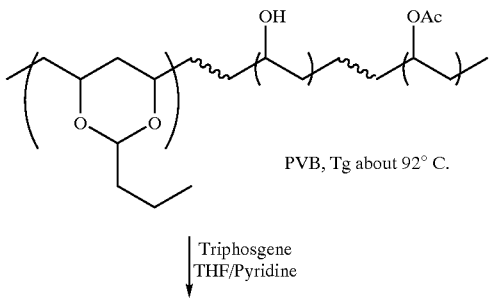

PVB, Tg about 92° C.

Triphosgene
THF/Pyridine

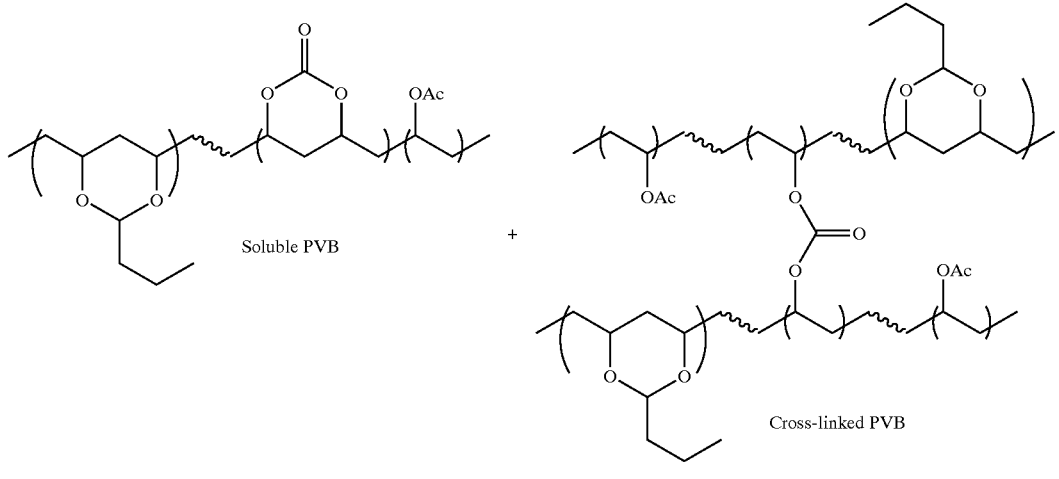

Soluble PVB + Cross-linked PVB

PVB-carbonate, Tg about 96° C.

The cyclic carbonate polymers may also be prepared using resins comprising phenolic groups, such as phenolic novolac resins. Phenolic novolac resins are known in the art, and typically comprise a repeating unit of a formula:

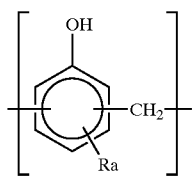

V wherein R comprises a $C_{1-8}$ alkyl group and a is from 0 to 3. Phenolic novolac resins typically have a number average molecular weight of at least about 600. Suitable phenolic novolac resins include poly(p-octylphenol-formaldehyde), poly(bisphenol-A-co-formaldehyde), and poly(bispehnol-A-co-formaldehyde-co-butylphenol).

The cyclic carbonates may be prepared by condensing a phenolic novolac with a carbonyl-donating compound, such as triphosgene, in the presence of a solvent, such as tetrahydrofuran, and, optionally, an acid scavenger such as pyridine.

While not being bound by theory, the reaction between the carbonyl-donating compound and several different phenolic novolac resins is believed to proceed as set forth in Reaction Sequence 2.

REACTION SEQUENCE 2

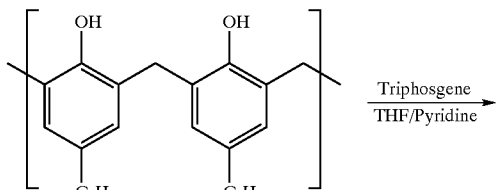

Poly(p-octylphenol-formaldehyde)

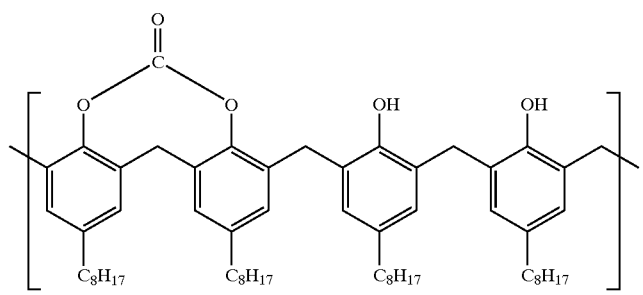

-continued

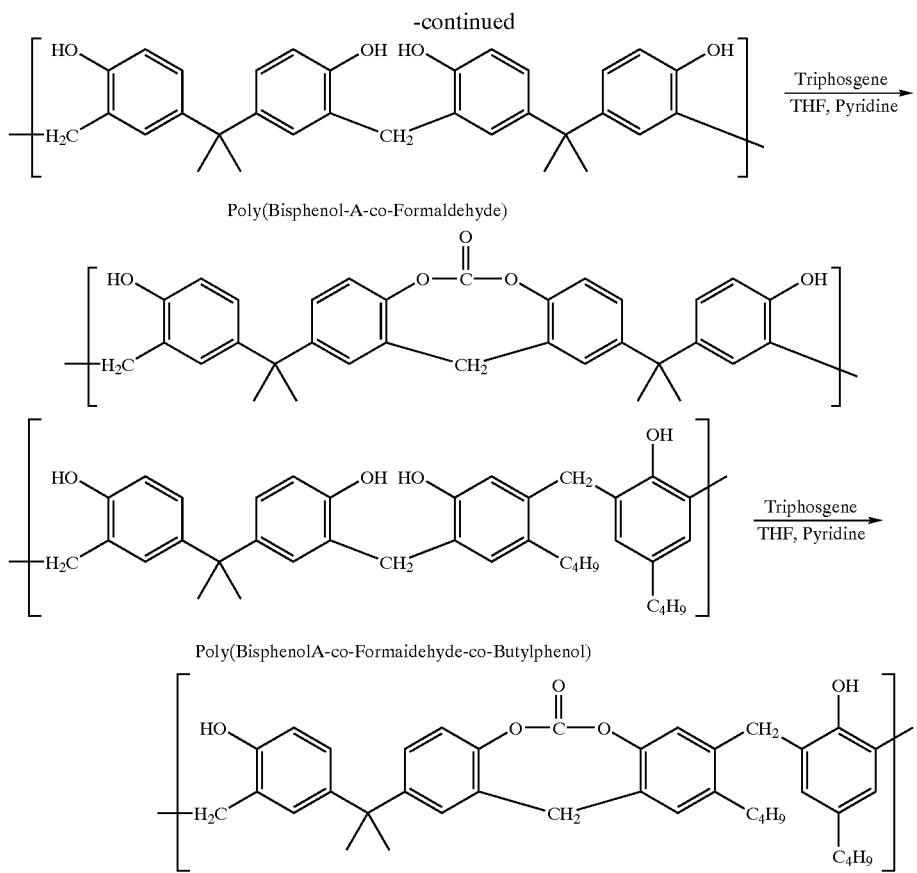

Poly(Bisphenol-A-co-Formaldehyde)

Poly(BisphenolA-co-Formaidehyde-co-Butylphenol)

Preferred cyclic carbonate polymers are soluble in organic solvents. Particularly preferred cyclic carbonate polymers include those which are soluble in tetrahydrofuran (THF), chlorinated hydrocarbons such as dichloromethane and chloroform, dioxane and polar aprotic solvents such as dimethyl acetamide, dimethyl formamide, N-methyl-2-pyrrolidinone and methyl sulfoxide.

Charge Generation Compositions and Layers

Charge generation layers in accordance with the present invention comprise a charge generation molecule and a cyclic carbonate polymer, and may further comprise a binder other than the cyclic carbonate polymer, such as polyvinylbutyral, polyvinylchloride, polyvinylacetate, polycarbonate polymers and copolymers other than cyclic carbonates; acrylic resins; polyamides; polyacrylamides, polyurethanes; epoxy resins; and phenolic resins.

The charge generation layers are formed from a charge generation layer-forming composition comprising the charge generation molecule and the cyclic carbonate polymer. Preferably, the charge generation layer-forming composition comprises a binder blend of a cyclic carbonate polymer and a second binder. In one embodiment, the second binder comprises a polyvinylbutyral polymer.

The binder blend may comprise the cyclic carbonate polymer and the second binder in a weight ratio of from about 95:5 to about 5:95, preferably from about 75:25 to about 25:75, more preferably about 50:50. The charge generation layer generally comprises, by weight, from about 12% to about 45%, preferably from about 26% to about 33%, of the cyclic carbonate polymer, from about 12% to about 45%, preferably from about 26% to about 33%, of the second binder, and from about 30% to about 60%, preferably from about 35% to about 45%, of the charge generation molecule.

Polyvinylbutyral polymers are well known in the art and are commercially available from various sources. These polymers are typically made by condensing poly(vinyl alcohol-co-vinyl acetate) with butyraldehyde in the presence of an acid catalyst, for example sulfuric acid, and contain a repeating unit of formula:

VIII

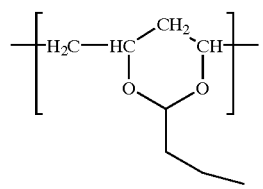

Typically, the polyvinylbutyral polymer will have a number average molecular weight of from about 20,000 to about 300,000.

Various organic and inorganic charge generation compounds are known in the art, any of which are suitable for use in the charge generation layers of the present invention. One type of charge generation compound which is particularly suitable for use in the charge generation layers of the present invention comprises squarylium-based pigments, including squaraines. Squarylium pigment may be prepared by an acid route such as that described in U.S. Pat. Nos. 3,617,270, 3,824,099, 4,175,956, 4,486,520 and 4,508,803, which employs simple procedures and apparatus, has a short reaction time and is high in yield.

Specific squarylium pigments suitable for use in the present invention may be represented by the structural formula:

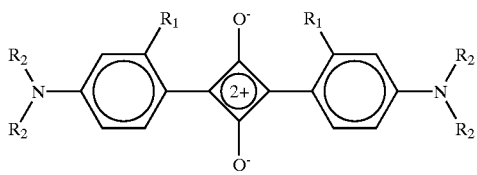

IX wherein $R_1$ represents hydroxy, hydrogen or $C_{1-5}$ alkyl, preferably hydroxy, hydrogen or methyl, and each $R_2$ individually represents $C_{1-5}$ alkyl or hydrogen. In a further preferred embodiment, the pigment comprises a hydroxy squaraine pigment wherein each $R_1$ in the formula set forth above comprises hydroxy.

Another type of pigment which is particularly suitable for use in the charge generation layers of the present invention comprises the phthalocyanine-based compounds. Suitable phthalocyanine compounds include both metal-free forms such as the X-form metal-free phthalocyanines and the metal-containing phthalocyanines. In a specific embodiment, the phthalocyanine charge generation compound may comprise a metal-containing phthalocyanine wherein the metal is a transition metal or a group IIIA metal. Of these metal-containing phthalocyanine charge generation compounds, those containing a transition metal such as copper, titanium or manganese or containing aluminum or gallium as a group IIIA metal are preferred. These metal-containing phthalocyanine charge generation compounds may further include oxy, thiol or dihalo substitution. Titanium-containing phthalocyanines as disclosed in U.S. Pat. Nos. 4,664,997, 4,725,519 and 4,777,251, including oxo-titanyl phthalocyanines, and various polymorphs thereof, for example type IV polymorphs, and derivatives thereof, for example halogen-substituted derivatives such as chlorotitanyl phthalocyanines, are suitable for use in the charge generation layers of the present invention.

Additional conventional charge generation compounds known in the art, including, but not limited to, diazo compounds, for example as disclosed in the Ishikawa et al., U.S. Pat. No. 4,413,045, and tris and tetrakis compounds as known in the art, are also suitable for use in the charge generation layers of the present invention. It is also within the scope of this invention to employ a mixture of charge generation pigments or compounds in the charge generation layer.

In one embodiment of the invention, the charge generation molecule is a pigment selected from the group consisting of azo pigments, anthraquinone pigments, polycyclic quinone pigments, indigo pigments, diphenylmethane pigments, azine pigments, cyanine pigments, quinoline pigments, benzoquinone pigments, napthoquinone pigments, naphthalkoxide pigments, perylene pigments, fluorenone pigments, squarylium pigments, azuleinum pigments, quinacridone pigments, phthalocyanine pigments, naphthaloxyanine pigments, porphyrin pigments and mixtures thereof. In a preferred embodiment, the charge generation molecule is a pigment selected from the group consisting of hydroxy squaraines, Type IV oxotitanium phthalocyanines, and mixtures thereof.

The charge generation layers may comprise the charge generation compound in amounts conventionally used in the art. Typically, the charge generation layer may comprise from about 5 to about 80, preferably at least about 10, and more preferably from about 15 to about 60, weight percent of the charge generation compound, and may comprise from about 20 to about 95, preferably not more than about 90, and more preferably comprises from about 40 to about 85, weight percent of total binder, all weight percentages being based on the charge generation layer. The charge generation layers may further contain any conventional additives known in the art for use in charge generation layers. The binder may be a blend comprising cyclic carbonate polymer and one or more second binders other than a cyclic carbonate polymer.

To form the charge generation layers according to the present invention, the binder and the charge generation compound are dissolved and dispersed, respectively, in an organic liquid. Although the organic liquid may generally be referred to as a solvent, and typically dissolves the cyclic carbonate polymer and any additional binder, the liquid technically forms a dispersion of the pigment rather than a solution. The cyclic carbonate polymer, pigment and additional binder may be added to the organic liquid simultaneously or consecutively, in any order of addition. Suitable organic liquids are preferably essentially free of amines and therefore avoid environmental hazards conventionally incurred with the use of amine solvents. Suitable organic liquids include, but are not limited to, tetrahydrofuran, cyclopentanone, 2-butanone and the like. Additional solvents suitable for dispersing the charge generation compound, cyclic carbonate polymer and any additional binder will be apparent to those skilled in the art.

In one embodiment the charge generation layer-forming composition generally comprises, by weight, from about 1% to about 25% by weight of solids. More preferably, the charge generation layer-forming composition comprises from about 1% to about 5%, by weight, of solids. In one specific embodiment, the charge generation layer-forming composition comprises from about 3% to about 4%, by weight, of solids. In a more specific embodiment, the charge generation layer-forming composition comprises from about 0.1% to about 20%, preferably from about 0.5% to about 2%, of the polyvinylbutyral and from about 0.1% to about 20%, preferably from about 0.5% to about 2% of the cyclic carbonate polymer. The polyvinylbutyral and the cyclic carbonate polymer form a binder blend. The weight ratio of polyvinylbutyral and the cyclic carbonate polymer in the binder blend is from about 95:5 to about 5:95, preferably from about 75:25 to about 25:75, more preferably about 50:50.

In accordance with techniques generally known in the art, the charge generation layer-forming composition preferably contains not greater than about 10 weight percent solids comprising the cyclic carbonate polymer, any additional binder and charge generation compound in combination. The compositions may therefore be used to form a charge generation layer of desired thickness, typically not greater than about 5 microns, and more preferably not greater than about 1 micron, in thickness. Additionally, a homogeneous layer may be easily formed using conventional techniques, for example dip-coating or the like. These compositions also reduce any wash or leach of the charge generation compound into a charge transport layer coating which is subsequently applied to the charge generation layer.

The charge generation layers according to the present invention exhibit good adhesion to underlying layers. Typically, the charge generation layer will be applied to a photoconductor substrate, with a charge transport layer formed on the charge generation layer. In accordance with techniques known in the art, one or more barrier layers may be provided between the substrate and the charge generation layer. Typically, such barrier layers have a thickness of from about 0.05 to about 20 microns. It is equally within the scope of the present invention that the charge transport layer is first formed on the photoconductor substrate, followed by formation of the charge generation layer on the charge transport layer.

Charge Transport Compositions and Layers

Charge transport layers in accordance with the present invention comprise at least one charge transport molecule. Conventional charge transport compounds suitable for use in the charge transport layer of the photoconductors of the present invention should be capable of supporting the injection of photo-generated holes or electrons from the charge generation layer and allowing the transport of these holes or electrons through the charge transport layer to selectively discharge the surface charge. Suitable charge transport compounds for use in the charge transport layer include, but are not limited to, the following:

1. Diamine transport molecules of the types described in U.S. Pat. Nos. 4,306,008, 4,304,829, 4,233,384, 4,115,116, 4,299,897, 4,265,990 and/or 4,081,274. Typical diamine transport molecules include benzidine compounds, including substituted benzidine compounds such as the N,N-diphenyl-N,N-bis(alkylphenyl)-(1,1'-biphenyl)-4,4'-diamines wherein the alkyl is, for example, methyl, ethyl, propyl, n-butyl, or the like, or halogen substituted derivatives thereof, and the like.

2. Pyrazoline transport molecules as disclosed in U.S. Pat. Nos. 4,315,982, 4,278,746 and 3,837,851. Typical pyrazoline transport molecules include 1-[lepidyl-(2)]-3-(p-diethylaminophenyl)-5-(p-diethylaminophenyl) pyrazoline, 1-[quinolyl-(2)]-3-(p-diethylaminophenyl)-5-(p-diethylaminophenyl)pyrazoline, 1-[pyridyl-(2)]-3-(p-diethylaminostyryl)-5-(p-diethylaminophenyl) pyrazoline, 1-[6-methoxypyridyl-(2)]-3-(p-diethylaminostyryl)-5-(p-diethylaminophenyl) pyrazoline, 1-phenyl-3-[p-diethylaminostyryl]-5-(p-diethylaminostyryl)pyrazoline, 1-phenyl-3-[p-diethylaminostyryl]-5-(p-diethylaminostyryl) pyrazoline, and the like.

3. Substituted fluorene charge transport molecules as described in U.S. Pat. No. 4,245,021. Typical fluorene charge transport molecules include 9-(4'-dimethylaminobenzylidene)fluorene, 9-(4'-methoxybenzylidene)fluorene, 9-(2,4'-dimethoxybenzylidene)fluorene, 2-nitro-9-benzylidene-fluorene, 2-nitro-9-(4'-diethylaminobenzylidene)fluorene and the like.

4. Oxadiazole transport molecules such as 2,5-bis(4-diethylaminophenyl)-1,3,4-oxadiazole, imidazole, triazole, and others as described in German Patents Nos. 1,058,836, 1,060,260 and 1,120,875 and U.S. Pat. No. 3,895,944.

5. Hydrazone transport molecules including p-diethylaminobenzaldehyde-(diphenylhydrazone), p-diphenylaminobenzaldehyde (diphenylhydrazone), o-ethoxy-p-diethylaminobenzaldehyde (diphenylhydrazone), o-methyl-p-diethylaminobenzaldehyde (diphenylhydrazone), o-methyl-p-diethylaminobenzaldehyde (diphenylhydrazone), p-dipropylaminobenzaldehyde-(diphenylhydrazone), p-diethylaminobenzaldehyde (benzylphenylhydrazone), p-dibutylaminobenzaldehyde-(diphenylhydrazone), p-diethylaminobenzaldehyde-(diphenylhydrazone) and the like described, for example, in U.S. Pat. No. 4,150,987. Other hydrazone transport molecules include compounds such as 1-naphthalenecarbaldehyde 1-methyl-1-phenylhydrazone, 1-naphthalenecarbaldehyde 1,1-phenylhydrazone, 4-methoxynaphthlene-1-carbaldehyde 1-methyl-1-phenylhydrazone and other hydrazone transport molecules described, for example, in U.S. Pat. Nos. 4,385,106, 4,338,388, 4,387,147, 4,399,208 and 4,399,207. Yet other hydrazone charge transport molecules include carbazole phenyl hydrazones such as 9-methylcarbazole-3-carbaldehyde- 1,1-diphenylhydrazone, 9-ethylcarbazole-3-carbaldehyde-1-methyl-1-phenylhydrazone, 9-ethylcarbazole-3-carbaldehyde-1-ethyl-1-phenylhydrazone, 9-ethylcarbazole-3-carbaldehyde-1-ethyl-1-benzyl-1-phenylhydrazone, 9-ethylcarbazole-3-carbaldehyde-1, 1-diphenylhydrazone, and other suitable carbazole phenyl hydrazone transport molecules described, for example, in U.S. Pat. No. 4,256,821. Similar hydrazone transport molecules are described, for example, in U.S. Pat. No. 4,297,426.

Preferably, the charge transport compound included in the charge transport layer comprises a hydrazone, an aromatic amine (including aromatic diamines such as benzidine), a substituted aromatic amine (including substituted aromatic diamines such as substituted benzidines), or a mixture thereof. Preferred hydrazone transport molecules include derivatives of aminobenzaldehydes, cinnamic esters or hydroxylated benzaldehydes. Exemplary aminobenzaldehyde-derived hydrazones include those set forth in the Anderson et al U.S. Pat. Nos. 4,150,987 and 4,362,798, while exemplary cinnamic ester-derived hydrazones and hydroxylated benzaldehyde-derived hydrazones are set forth in the copending Levin et al U.S. applications Ser. Nos. 08/988,600 and 08/988,791, respectively, all of which patents and applications are incorporated herein by reference.

In one embodiment, the charge transport compound comprises a compound selected from the group consisting of poly(N-vinylcarbazole)s, poly(vinylanthracene)s, poly(9, 10-anthracenenylene-dodecanedicarboxylate)s, polysilanes, polygermanes, poly(p-phenylene-sulfide), hydrazone compounds, pyrazoline compounds, enamine compounds, styryl compounds, arylmethane compounds, arylamine compounds, butadiene compounds, azine compounds, and mixtures thereof. In a preferred embodiment, the charge transport compound comprises a compound selected from the group consisting of p-diethylaminobenzaldehyde-(diphenylhydrazone) (DEH), N,N-bis-(3-methylphenyl)-N, N-bis-phenyl-benzidine (TPD) and mixtures thereof. TPD has the formula:

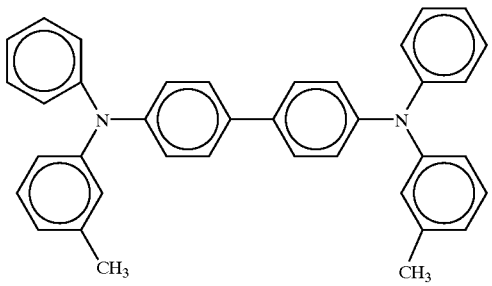

The charge transport layer typically comprises the charge transport compound in an amount of from about 5 to about 60 weight percent, more preferably in an amount of from about 15 to about 40 weight percent, based on the weight of the charge transport layer, with the remainder of the charge transport layer comprising binders and any conventional additives. Any binders conventionally used in charge transport layers may be employed and include, but are not limited to, polycarbonate resins, polyester resins, polymethacrylic resins, polystyrene resins and mixtures thereof.

Suitable polycarbonates include polycarbonate-A's, polycarbonate-Z's, and mixtures thereof. Preferred polycarbonates have a number average molecular weight of from about 10,000 to about 100,000, more specifically from about 20,000 to about 80,000. A preferred polycarbonate includes a polycarbonate-A having the structure set forth below.

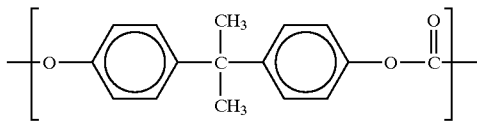

VII

Such a polycarbonate-A is available from Bayer Corporation as MAKROLON®-5208 polycarbonate, having a number average molecular weight of about 34,000.

The charge transport layer will typically have a thickness of from about 10 to about 40 microns and may be formed in accordance with conventional techniques known in the art. Conveniently, the charge transport layer may be formed by preparing a charge transport composition, coating the charge transport composition on the respective underlying layer and drying the coating. To form the charge transport composition according to the present invention, the binder, preferably a polycarbonate, and the charge transport compound are dispersed or dissolved in an organic liquid. Although the composition which forms the charge transport layer may be referred to as a solution, the binder and charge transport compound may disperse rather than dissolve in the organic liquid, thus the composition may be in the form of a dispersion rather than a solution. The binder and charge transport compound may be added to the organic liquid simultaneously or consecutively, in any order of addition. Suitable organic liquids are preferably essentially free of amines and therefore avoid environmental hazards conventionally incurred with the use of amine solvents. Suitable organic liquids include, but are limited to, tetrahydrofuran, 1,2-dioxane, 1,4-dioxane, and the like. Additional solvents suitable for dispersing the charge transport compound and binder will be apparent to those skilled in the art.

Photoconductors

The photoconductor substrate may be flexible, for example in the form of a flexible web or a belt, or inflexible, for example in the form of a drum. Typically, the photoconductor substrate is uniformly coated with a thin layer of a metal, preferably aluminum, which functions as an electrical ground plane. In a further preferred embodiment, the aluminum is anodized to convert the aluminum surface into a thicker aluminum oxide surface. Alternatively, the ground plane member may comprise a metallic plate formed, for example, from aluminum or nickel, a metallic drum or foil, or a plastic film on which aluminum, tin oxide, indium oxide or the like is vacuum evaporated. Typically, the photoconductor substrate will have a thickness adequate to provide the required mechanical stability. For example, flexible web substrates generally have a thickness of from about 0.01 to about 0.1 microns, while drum substrates generally have a thickness of from about 0.75 mm to about 1 mm.

The charge generation and charge transport compositions may be applied to the substrate using any suitable coating technique such as dip-coating, roll-coating, and spray-coating. Any suitable drying method may be used to dry the compositions, such as oven drying, forced air drying, or infrared radiation drying.

Photoconductors in accordance with the invention charge and discharge at a short time interval, such as from about 0.05 to about 0.30 seconds. In one embodiment, a photoconductor having a charge generation layer comprising a binder blend of polyvinylbutyral binder and cyclic carbonate polymer binder exhibits reduced fatigue and/or dark decay as compared to a photoconductor having a charge generation layer comprising the same amount of total binder but wherein the binder comprises polyvinyl butyral binder, in the absence of the cyclic carbonate polymer.

The following examples demonstrate the preparation of cyclic carbonate polymers for use in the invention and demonstrate charge generation layers, photoconductors and methods according to the invention. In the examples and throughout the present specification, parts and percentages are by weight unless otherwise indicated.

Preparatory Example A

Preparation of Phenolic Novolac Cyclic Carbonate Polymer

A phenolic novolac poly(p-octylphenol-formaldehyde) resin (CRJ-418,Mn~1433, 4.0 g, 18.32 mmol), is placed in a three-neck round bottom flask and dissolved in about 30. grams of tetrahydrofuran (THF), using a magnetic stirrer. The flask is fitted with a dropping funnel and condenser. Pyridine (about 10 drops) is added to the flask. Triphosgene (2.42 g, 9.16 mmol) is weighed into the dropping funnel and dissolved in about 20 ml of THF. The triphosgene/THF solution is added dropwise to a rapidly stirred solution of the phenolic novolac in THF. The light-brown solution turns colorless, with precipitation of pyridinium hydrochloride. Addition is continued over 20 minutes. The white slurry is stirred at ~60° C. for 4 hours. The white precipitate is filtered through a fluted filter paper. The filtrate is washed and extracted with water and 1,2-dichloroethane. The colorless organic layer is washed with 5% sodium hydroxide (~50 ml), and water and dried over anhydrous magnesium sulfate. The organic layer is roto-evaporated to obtain a viscous light yellow-brown oil, which solidifies to a light brown solid. The reaction yields about 4.12 grams of cyclic carbonate polymer having a number average molecular weight (Mn) of about 1917, a polydispersity (Mw/Mn) of about 1.36, and a glass transition temperature of about 96° C.

Preparatory Example B

Preparation of Poly(vinylbutyral-vinylacetate-vinylcarbonate)

Poly(vinylbutyral-vinylalcohol-vinylacetate) resin (BX-55Z, S-Lec-B, Sekisui Chemicals, Mn~98k, Tg~92° C., 4.0 g, 18.32 mmol)) is placed in a three-neck round bottom flask and dissolved in 30 g of THF using a magnetic stirrer. The flask is fitted with a dropping funnel and condenser. Pyridine (about 10 drops) is added to the flask. Triphosgene (2.42 g, 9.16 mmol) is weighed into the dropping funnel and dissolved in about 20 mL of THF. The triphosgene/THF solution is added dropwise to a rapidly stirred solution of the resin in THF. The white precipitate is filtered through a fluted filter paper. The filtrate is washed and extracted with water and 1,2-dichloroethane. The organic layer is roto-evaporated to obtain a viscous light yellow-brown oil, which solidifies to a light brown solid. The yield is about 2.1 grams of cyclic carbonate polymer.

EXAMPLE 1

This example demonstrates a photoconductor in accordance with the invention, with the charge generation layer comprising polyvinylbutyral binder and a cyclic carbonate polymer, namely poly(vinylbutyral-vinylcarbonate), in a weight ratio of polyvinylbutyral to cyclic carbonate polymer of about 50:50. The charge generation layer-forming composition is prepared by adding oxotitanium phthalocyanine, polyvinylbutyral, poly(vinylbutyral-vinylcarbonate) and Potter's glass beads to tetrahydrofuran in an amber glass bottle, agitating in a paint-shaker for 12 hours and diluting with 2-butanone and cyclohexanone.

The charge generation layer-forming composition is set forth in Table 1. Percent solids refer to the percent solids in the composition after diluting with 2-butanone and cyclohexanone.

A photoconductor drum is prepared by first dip-coating an anodized aluminum drum with the charge generation composition and drying the drum at 100° C. for 5 minutes. A charge transport composition is prepared from a bisphenol-A polycarbonate (MAK-5208, Bayer, 62.30 g), benzidine (26.70 g) in tetrahydrofuran (THF, 249 g) and 1,4-dioxane (106 g). The CGL layer-containing coated drum is dip-coated with the charge transport composition, and dried at 120° C. for 1 hour.

Electrical characteristics of photoconductors as prepared herein are set forth in Table 2.

Comparative Examples 1 and 2

These examples demonstrate prior art photoconductors comprising a charge generation layer comprising polyvinylbutyral binder in the absence of cyclic carbonate polymer. The charge generation compositions are prepared by adding oxotitanium phthalocyanine, polyvinylbutyral (BX-55Z, Sekisui Chemical Co.) and Potter's glass beads to tetrahydrofuran in an amber glass bottle, agitating in a paint-shaker for 12 hours and diluting with 2-butanone and cyclohexanone. The photoconductors of these comparative examples are otherwise prepared as described in Example 1. The charge generation layer-forming compositions of these comparative examples are also set forth in Table 1. The resulting comparative photoconductors are subjected to measurement of electrical characteristics, and the results of the measurements are set forth in Table 2.

TABLE 1

Charge Generation Layer-Forming Compositions

| Ingredient | Example 1 | Comparative Example 1 | Comparative Example 2 |
| --- | --- | --- | --- |
| Oxotitanium phthalocyanine | 2.1 g | 2.1 g | 2.7 g |
| Polyvinylbutyral | 1.95 g | 3.9 g | 3.3 g |
| Poly(vinylbutyral-vinylcarbonate) | 1.95 g | — | — |
| 2-Butanone | 130 g | 130 g | 175 g |
| Cyclohexanone | 14 g | 14 g | 19 g |
| Glass Beads | 30 ml | 30 ml | 30 ml |
| % Solids | 4% | 4% | 3% |
| Pigment/Binder Weight Ratio | 35/65 | 35/65 | 45/55 |

TABLE 2

Electrical Characteristics (@76 ms)

| Sample Drum | Charge (−V) | $-V_{(0.21\ mJ/cm2)}$ | −Vr (residual) | Dark Decay (V/sec) |
| --- | --- | --- | --- | --- |
| Example 1 | 849 | 258 | 102 | 101 |
| Comparative Example 1 | 847 | 451 | 288 | 309 |
| Comparative Example 2 | 848 | 304 | 119 | 134 |

As indicated by the data in Table 2, the addition of the cyclic carbonate polymer provides improved electrical characteristics to the photoconductor of Example 1. The photoconductor of Example 1 having a charge generation layer comprising 35%, by weight, pigment and the cyclic carbonate polymer/polyvinylbutyral blend exhibits better sensitivity and dark decay than the photoconductor of Comparative Example 1 comprising 35%, by weight, pigment and polyvinylbutyral. The photoconductor of Example 1 having a charge generation layer comprising 35%, by weight, pigment and the polyvinylcarbonate/polyvinylbutyral blend exhibits electrical characteristics similar to, if not better than, those of the photoconductor of Comparative Exampe 2 comprising 45%, by weight, pigment and polyvinylbutyral. Thus, the addition of cyclic carbonate polymer to a charge generation layer allows for use of less pigment. A lower pigment concentration and/or a higher binder concentration is believed to improve the adhesion of the coatings to the substrate.

Preparatory Example C

The improvements in electrical sensitivity provided by the polyvinylbutyral-derived cyclic carbonate polymer of Example 1 are also provided by phenolic novolac-derived cyclic carbonate polymers. Cyclic carbonate polymers are prepared by condensing the phenolic novolac resins with triphosgene, using tetrahydrofuran as a solvent and pyridine as an acid scavenger.

The molecular weights for the resulting cyclic carbonate polymers and the ratio of the glass transition temperature (Tg) of the phenolic novolac ("pre-polymer") to the glass transition temperature of the cyclic carbonate polymers are set forth below in Table 3. While not bound by theory, it is believed that condensation may occur between intra-chain hydroxyl groups and between inter-chain hydroxyl groups. Reaction between the inter-chain hydroxyls is believed to result in a significant increase in molecular weight.

TABLE 3

Characterization of Phenolic Novolacs and Corresponding Carbonates

| Pre-Polymer | Pre-Polymer Mn/Mw | Pre-Polymer PD* | Cyclic carbonate Mn/Mw | Cyclic carbonate PD* | Pre-Polymer/ Cyclic Carbonate Tg (° C.) |
| --- | --- | --- | --- | --- | --- |
| CRJ-418 poly(p-Octylphenol-formaldehyde) | 1507/2096 | 1.39 | 2690/3694 | 1.37 | 75/81 |
| CRJ-406 poly(BP-A-Formaldehyde) | 1423/4252 | 2.99 | 2510/13823 | 5.51 | 79/87 |

TABLE 3-continued

Characterization of Phenolic Novolacs and Corresponding Carbonates

| Pre-Polymer | Pre-Polymer Mn/Mw | Pre-Polymer PD* | Cyclic carbonate Mn/Mw | Cyclic carbonate PD* | Pre-Polymer/ Cyclic Carbonate Tg (° C.) |
|---|---|---|---|---|---|
| HRJ-13172 poly(BP-A-co-t-buPhenol-formaldehyde) | 629/1028 | 1.63 | 1243/2516 | 2.02 | 69/104 |

*PD = Polydispersity

EXAMPLE 2

This example demonstrates a photoconductor in accordance with the invention comprising a charge generation layer comprising polyvinylbutyral binder and poly(p-octylphenol-formaldehyde-carbonate), a cyclic carbonate polymer prepared using poly(p-octylphenol-formaldehyde) (CRJ-418-carbonate), in a weight ratio of polyvinylbutyral to cyclic carbonate polymer of about 50:50. The charge generation layer-forming composition is prepared by adding oxotitanium phthalocyanine, polyvinylbutyral, the cyclic carbonate polymer and Potter's glass beads to tetrahydrofuran in an amber glass bottle, agitating in a paint-shaker for 12 hours and diluting with 2-butanone and cyclohexanone.

The charge generation layer-forming composition is set forth in Table 4. Percent solids refer to the percent solids in the composition after diluting with 2-butanone and cyclohexanone.

The photoconductor of Example 2 is prepared by first dip-coating an anodized aluminum drum with the charge generation composition and drying the drum at 100° C. for 5 minutes. The charge transport composition comprises about 30%, by weight, N,N-bis-(3-methylphenyl)-N,N'-bisphenyl-benzidine (TPD), polycarbonate (Makrolon-5208, Bayer) and poly(bisphenol-A-perfluorobiphenyl) in a polycarbonate/poly-(bisphenol-A-perfluorobiphenyl) weight ratio of about 93:7. The CG layer coated drum is dip-coated with the charge transport composition and dried at 120° C. for 1 hour.

Electrical characteristics of the resulting photoconductor are measured and are set forth in Table 5.

Comparative Examples 3–5

Comparative Examples 3 and 4 demonstrate prior art photoconductors comprising a charge generation layer comprising polyvinylbutyral binder. The charge generation compositions are prepared by adding oxotitanium phthalocyanine, polyvinylbutyral (BX-55Z, Sekisui Chemical Co.) and Potter's glass beads to tetrahydrofuran in an amber glass bottle, agitating in a paint-shaker for 12 hours and diluting with 2-butanone and cyclohexanone.

The photoconductor of Comparative Example 5 comprises a charge generation layer comprising polyvinylbutyral binder and a phenolic novolac comprising poly(p-octylphenol-formaldehyde) (CRJ-418, Schenectady) in a weight ratio of polyvinylbutyral to phenolic novolac of about 50:50. The charge generation composition is prepared by adding oxotitanium phthalocyanine, polyvinylbutyral, poly(p-octylphenol-formaldehyde) and Potter's glass beads to tetrahydrofuran in an amber glass bottle, agitating in a paint-shaker for 12 hours and diluting with 2-butanone and cyclohexanone.

The compositions for forming the charge generation layers of the photoconductors of these comparative examples are also set forth in Table 4. The photoconductors of these comparative examples are prepared as described in Example 2, including the described charge transport composition. The resulting photoconductors are subjected to measurement of electrical characteristics as set forth in Table 5.

TABLE 4

Charge Generation Composition Formulations

| Ingredient | Example 2 | Comparative Example 3 | Comparative Example 4 | Comparative Example 5 |
|---|---|---|---|---|
| Oxotitanium phthalocyanine | 2.1 g | 2.1 g | 2.7 g | 2.1 g |
| Polyvinylbutyral | 1.95 g | 3.9 g | 3.3 g | 1.95 g |
| CRJ-418 Phenolic Novolac | — | — | — | 1.95 g |
| CRJ-418-Carbonate | 1.95 g | — | — | — |
| 2-Butanone | 130 g | 130 g | 175 g | 130 g |
| Cyclohexanone | 14 g | 14 g | 19 g | 14 g |
| Glass Beads | 30 ml | 30 ml | 30 ml | 30 ml |
| % Solids | 4% | 4% | 3% | 4% |
| Pigment/Binder Weight Ratio | 35/65 | 35/65 | 45/55 | 35/65 |

CRJ-418 = Poly(p-octylphenol-formaldehyde) (Schenectady)

TABLE 5

Initial Electrical Characteristics

| Sample Drum | Charge (−Vo) | Residual voltage (−Vr) | −V$_{(0.21\ ml/cm2)}$ |
|---|---|---|---|
| Example 2 | 851 | 97 | 312 |
| Comparative Example 3 | 852 | 224 | 406 |
| Comparative Example 4 | 851 | 195 | 344 |
| Comparative Example 5 | 848 | 100 | 345 |

The use of either a phenolic novolac such as CRJ-418 (poly(p-octylphenol-formaldehyde)) resin, or its corresponding cyclic carbonate polymer in the charge generation layer improves the electrical sensitivity of a photoconductor drum as demonstrated in Example 2 and Comparative Example 5. The photoconductors having a charge generation layer comprising 35%, by weight, pigment and poly(p-octylphenol-formaldehyde) resin (Comparative Example 5) or its corresponding cyclic carbonate polymer (Example 2) exhibit better sensitivity and dark decay than the photoconductor comprising 35%, by weight, pigment and the polyvinylbutyral alone (Comparative Example 3). Moreover, the photoconductors having a charge generation layer comprising 35%, by weight, pigment and the poly(p-octylphenol-formaldehyde) resin (Comparative Example 5) or its corresponding cyclic carbonate polymer (Example 2) exhibit electrical characteristics similar to those of the photoconductor comprising 45%, by weight, pigment and the polyvinylbutyral (Comparative Example 4).

The photoconductors of Comparative Examples 4 and 5, and Example 2 are also evaluated for their print stability in an Optra-S 2450 printer. Print quality parameter results are set forth in Table 6, while change in charge, streak, and discharge voltages through cartridge life are set forth in Table 7.

TABLE 6

Life-test Results of Print Quality Parameters

| Sample Drum | Pages | TTP/TTC | WOB | BOW | Avg. Isopel OD | AB OD | Avg. Bkgnd |
|---|---|---|---|---|---|---|---|
| Example 2 | 22,904 | 16.7/6.7 | 10/10 | 125/125 | 0.61 | 1.47/1.43 | 0.73 |
| Comparative Example 4 | 26,472 | 15.8/4.2 | 10/12 | 126/126 | 0.74 | 1.45/1.41 | 0.65 |
| Comparative Example 5 | 23,240 | 16.2/4.3 | 10/10 | 124/124 | 0.51 | 1.42/1.41 | 0.65 |

TTP/TTC = Toner-to-Page/Toner-to-cleaner, both in mg/page
WOB = White-on-black
BOW = Black-on-white
Avg. Isopel OD = Average isopel optical density
AB OD = All black optical density
Avg. Bkgnd = Average background

TABLE 7

Change in Charge/Streak/Discharge Voltage Through Life of Cartridge

| Sample Drum | Charge voltage, −V SOL/EOL* | Streak voltage, −V SOL/EOL* | Discharge voltage, −V SOL/EOL* |
|---|---|---|---|
| Example 2 | −869/−850 | −502/−536 | −156/−145 |
| Comparative Example 4 | −837/−867 | −455/−514 | −163/−155 |
| Comparative Example 5 | −779/−893 | −416/−462 | −116/−166 |

*SOL/EOL: Start-of-life/End-of-life

The WOB and BOW of Table 6 are measured on a gray scale page, wherein the page is divided into 128 boxes corresponding to various shades of gray and ranging from an all-white box to an all-black box, through 126 intermediate boxes. The change in the WOB and BOW corresponds to any fatigue involved with the photoconductor. As indicated by Table 6, the print stability is improved by the use of the phenolic novolac (Comparative Example 5) or its carbonate (Example 2) in the charge generation layer. However, as indicated by the start-of-life and end-of-life measurements set forth in Table 7, the charge voltage increases over the life of the photoconductor of Comparative Example 5 containing the phenolic novolac.

The comparative photoconductor also exhibits significant negative fatigue, i.e, an increase in the discharge voltage. In contrast, the photoconductor of Example 2 containing the cyclic carbonate polymer is more stable both in print-quality and in electrical characteristics.

EXAMPLE 3

In this example, a photoconductor in accordance with the invention comprises a charge generation layer comprising polyvinylbutyral binder and poly(p-octylphenol-formaldehyde-carbonate), a cyclic carbonate polymer prepared using poly(p-octylphenol-formaldehyde). The weight ratio of polyvinylbutyral to cyclic carbonate polymer is about 50:50. The charge generation composition is prepared by adding oxotitanium phthalocyanine, polyvinylbutyral, the cyclic carbonate polymer and Potter's glass beads to tetrahydrofuran in an amber glass bottle, agitating in a paint-shaker for 12 hours and diluting with 2-butanone and cyclohexanone.

The charge generation layer-forming composition is set forth below in Table 8. Percent solids refer to the percent solids in the composition after diluting with 2-butanone and cyclohexanone.

The photoconductor is prepared by first dip-coating an anodized aluminum drum with the charge generation composition and drying the drum at 100° C. for 5 minutes. The charge transport composition comprises about 30%, by weight of composition, TPD, and a binder blend comprising about 93%, by weight of binder blend, polycarbonate, and about 7%, by weight of binder blend, poly(bisphenol-A-perfluorobiphenyl). The CG layer-coated drum is dip-coated with the charge transport composition, and dried at 120° C. for 1 hour.

Print quality parameters are measured and the results are set forth in Table 9. Changes in charge, streak, and discharge voltages through cartridge life are set forth in Table 10.

Comparative Example 6

Comparative Example 6 is directed to a photoconductor comprising a charge generation layer comprising polyvinylbutyral binder and a poly(p-octylphenol-formaldehyde) in a weight ratio of polyvinylbutyral to phenolic novolac of about 50:50. The charge generation layer-forming composition is prepared by adding oxotitanium phthalocyanine, polyvinylbutyral, poly(p-octylphenol-formaldehyde) and Potter's glass beads to tetrahydrofuran in an amber glass bottle, agitating in a paint-shaker for 12 hours and diluting with 2-butanone and cyclohexanone.

The composition for forming the CGL of this comparative photoconductor is set forth in Table 8. The photoconductor of Comparative Example 6 is prepared as described in Example 3, including the charge transport layer described therein. The resulting photoconductor is subjected to measurement of print quality parameters as set forth in Table 9 and charge, streak and discharge voltages through cartridge life as set forth in Table 10.

TABLE 8

Charge Generation Composition Formulations

| Ingredient | Comparative Example 6 | Example 3 |
|---|---|---|
| Oxotitanium phthalocyanine | 2.36 g | 2.36 g |
| Polyvinylbutyral | 2.19 g | 2.19 g |
| CRJ-418 Phenolic Novolac | 2.19 g | — |
| CRJ-418-Carbonate | — | 2.19 g |
| 2-Butanone | 130 g | 130 g |
| Cyclohexanone | 14 g | 14 g |
| Glass Beads | 30 ml | 30 ml |
| % Solids | 4% | 4% |
| Pigment/Binder Weight Ratio | 35/65 | 35/65 |

CRJ-418 = Poly(p-octylphenol-formaldehyde)

TABLE 9

Life-test Results of Print Quality Parameters

| Sample Drum | Pages | TTP/TTC | WOB | BOW | Avg. Isopel OD | AB OD | Avg. Bkgnd |
|---|---|---|---|---|---|---|---|
| Example 3 | 24,888 | 16.5/5.5 | 15/18 | 125/126 | 0.85 | 1.45/1.41 | 0.68 |
| Comparative Example 6 | 19,652 | 21.4/4.4 | 20/25 | 125/126 | 0.96 | 1.40/1.34 | 0.75 |

TABLE 10

Change in Charge/Streak/Discharge Voltage Through Life of Cartridge

| Sample Drum | Charge voltage SOL/EOL | Streak voltage SOL/EOL | Discharge voltage SOL/EOL |
|---|---|---|---|
| Example 3 | −871/−881 | −383/−429 | −148/−141 |
| Comparative Example 6 | −784/−896 | −301/−424 | −105/−102 |

As indicated by the data in Tables 9 and 10, the photoconductor of Example 3 comprising the phenolic novolac carbonate is more stable in its performance and, in particular, the electrical characteristics are more uniform as compared with the photoconductor of Comparative Example 6 comprising the phenolic novolac parent polymer.

EXAMPLE 4 and

Comparative Example 7

A comparison of phenolic novolac and a corresponding cyclic carbonate polymer as charge generation layer binders is performed in photoconductors having N,N-diethylamino benzaldehyde-1,1-diphenylhydrazone (DEH) as the charge transport molecule.

In Example 4, the photoconductor in accordance with the invention comprises a charge generation layer comprising polyvinylbutyral binder and poly(p-octylphenol-formaldehyde-carbonate), a cyclic carbonate prepared using poly(p-octylphenol-formaldehyde) (CRJ-418), in a weight ratio of polyvinylbutyral to cyclic carbonate polymer of about 75:25. The charge generation composition is prepared by adding oxotitanium phthalocyanine, polyvinylbutyral, the cyclic carbonate and Potter's glass beads to tetrahydrofuran in an amber glass bottle, agitating in a paint-shaker for 12 hours and diluting with 2-butanone and cyclohexanone.

In Comparative Example 7, the comparative photoconductor comprises a charge generation layer comprising polyvinylbutyral binder and a poly(p-octylphenol-formaldehyde) (CRJ-418) in a weight ratio of polyvinylbutyral to phenolic novolac of about 75:25. The charge generation composition is prepared by adding oxotitanium phthalocyanine, polyvinylbutyral, poly[]p-octylphenol-formaldehyde) and Potter's glass beads to tetrahydrofuran in an amber glass bottle, agitating in a paint-shaker for 12 hours and diluting with 2-butanone and cyclohexanone.

The charge generation layer-forming compositions are set forth in Table 11. Percent solids refer to the percent solids in the compositions after diluting with 2-butanone and cyclohexanone.

TABLE 11

Charge Generation Composition Formulations

| Ingredient | Example 4 | Comparative Example 7 |
|---|---|---|
| Oxotitanium phthalocyanine | 2.7 g | 2.7 g |
| Polyvinylbutyral | 2.47 g | 2.47 g |
| CRJ-418 Phenolic Novolac | — | 0.83 g |
| CRJ-418-Carbonate | 0.83 g | — |
| 2-Butanone | 174 g | 174 g |
| Cyclohexanone | 19 g | 19 g |
| Glass Beads | 60 ml | 60 ml |
| % Solids | 3% | 3% |
| Pigment/Binder Weight Ratio | 45/55 | 45/55 |

CRJ-418 = Poly(p-octylphenol-formaldehyde)

The photoconductors are prepared by first dip-coating an anodized aluminum drum with the charge generation compositions and drying the drums at 100° C. for 5 minutes. A charge transport composition is prepared from polycarbonate A (Makrolon-5208, 53.1 g), DEH (28.5 g), Acetosol Yellow (0.68 g) and 4 drops of surfactant in tetrahydrofuran (THF, 245 g) and 1,4-dioxane (81 g). The CG layer coated drums are dip-coated with the charge transport composition, and dried at 120° C. for 1 hour.

The initial electricals of the drums are set forth in Table 12.

TABLE 12

Initial Electrical Values

| Sample Drum | Charge (−Vo) | Residual voltage (−Vr) | −V$_{(0.21 mJ/cm2)}$ |
|---|---|---|---|
| Example 4 | 850 | 196 | 366 |
| Comparative Example 7 | 850 | 225 | 400 |

The data in Table 12 indicates that the cyclic carbonate polymer improves the sensitivity of the photoconductor of Example 4 as compared to the phenolic novolac in the photoconductor of Comparative Example 7.

Additional embodiments and modifications within the scope of the claimed invention will be apparent to one of ordinary skill in the art. Accordingly, the scope of the present invention shall be considered in the terms of the following claims, and is understood not to be limited to the details or the methods described in the specification, or any specific or preferred embodiments thereof.

What is claimed is:

1. A photoconductor comprising a substrate and a charge generation layer, wherein the charge generation layer comprises cyclic carbonate polymer.

2. A photoconductor according to claim 1, wherein the charge generation layer further comprises a charge generation molecule and polyvinylbutyral.

3. A photoconductor according to claim 2, further comprising a charge transport layer.

4. A photoconductor according to claim 1, wherein the cyclic carbonate polymer is prepared by reacting at least one hydroxy-containing polymer and at least one carbonyl-donating compound.

5. A photoconductor according to claim 4, wherein the carbonyl-donating compound comprises a phosgene compound.

6. A photoconductor according to claim 5, wherein the carbonyl-donating compound comprises triphosgene.

7. A photoconductor according to claim 4, wherein hydroxyl-containing polymer comprises poly(p-octylphenolformaldehyde), poly(vinylbutyral-vinylalcohol-vinylacetate), poly(bisphenol-A-co-formaldehyde), poly(bisphenol-A-co-formaldehyde-co-butylphenol), or mixtures thereof.

8. A photoconductor according to claim 2, wherein the charge generation molecule comprises a compound selected from the group consisting of azo compounds, anthraquinone compounds, polycyclic quinone compounds, indigocompounds, diphenylmethane compounds, azine compounds, cyanine compounds, quinoline compounds, benzoquinone compounds, naphthoquinone compounds, naphthalkoxide compounds, perylene compounds, fluorenone compounds, squarylium compounds, azuleinum compounds, quinacridone compounds, phthalocyanine compounds, naphthaloxyanine compounds, porphyrin compounds, and mixtures thereof.

9. A photoconductor according to claim 8, wherein the pigment comprises phthalocyanines, squaraines or mixtures thereof.

10. A photoconductor according to claim 3, wherein the charge transport layer comprises a charge transport compound selected from the group consisting of poly(N-vinylcarbazole)s, poly(vinylanthracene)s, poly(9,10-anthracenenylene-dodecanedicarboxylate)s, polysilanes, polygermanes, poly(p-phenylene-sulfide)s, hydrazone compounds, pyrazoline compounds, enamine compounds, styryl compounds, arylmethane compounds, arylamine compounds, butadiene compounds, azine compounds and mixtures thereof.

11. A photoconductor according to claim 1, wherein the charge generation layer comprises a titanyl phthalocyanine, polyvinylbutyral and a cyclic carbonate polymer; and further wherein the cyclic carbonate polymer is prepared by reacting a hydroxy-containing polymer selected from the group consisting of poly(p-octylphenolformaldehyde), poly(vinylbutyral-vinylalcohol-vinylacetate), poly(bisphenol-A-co-formaldehyde), poly(bisphenol-A-co-formaldehyde-co-butylphenol), and mixtures thereof, with triphosgene.

12. A photoconductor according to claim 11, wherein the weight ratio of polyvinylbutyral to cyclic carbonate polymer is from about 75:25 to about 25:75.

13. A photoconductor according to claim 12, wherein the weight ratio of titanyl phthalocyanine to the total amount of polyvinylbutyral and cyclic carbonate polymer is from about 35:65 to about 45:55.

14. A photoconductor according to claim 1, wherein the charge generation layer comprises a binder blend comprising polyvinylbutyral and cyclic carbonate polymer; and further wherein the photoconductor comprising the binder blend exhibits less dark decay than a photoconductor having a charge generation layer comprising the same amount of total binder, and the binder comprises polyvinylbutyral without cyclic carbonate polymer.

15. A method of improving an electrical characteristic of a photoconductor, comprising the step of forming a photoconductor comprising a substrate and a charge generation layer comprising a charge generation molecule and a cyclic carbonate polymer.

16. A method according to claim 15, wherein the charge generation layer further comprises polyvinylbutyral.

17. A method according to claim 16, wherein the cyclic carbonate polymer is prepared by reacting at least one hydroxy-containing polymer and at least one phosgene compound.

18. A method according to claim 17, wherein the electric characteristic is selected from the group consisting of sensitivity, dark decay, and stable fatigue.

19. A method of improving the stability of a photoconductor having a charge generation layer comprising a charge generation molecule and polyvinylbutyral, the method comprising the step of adding to the charge generation layer a cyclic carbonate polymer.

20. A method according to claim 19, wherein the weight ratio of polyvinylbutyral to cyclic carbonate polymer is from about 25:75 to about 75:25.

21. A method according to claim 20, wherein cyclic carbonate polymer is synthesized from a hydroxy-containing polymer and triphosgene.

22. A method according to claim 21, wherein the hydroxy-containing polymer comprises poly(p-octylphenolformaldehyde), poly(vinylbutyral-vinylalcohol-vinylacetate), poly(bisphenol-A-co-formaldehyde), poly(bisphenol-A-co-formaldehyde-co-butylphenol), or mixtures thereof.

23. A charge generation layer-forming composition comprising pigment, solvent and a binder blend, wherein the binder blend comprises polyvinylbutyral and a cyclic carbonate polymer.

24. A charge generation layer-forming composition according to claim 23, wherein the weight ratio of polyvinylbutyral to cyclic carbonate polymer is from about 75:25 to about 25:75.

25. A charge generation layer-forming composition according to claim 23, wherein the cyclic carbonate polymer is prepared by reacting at least one hydroxy-containing polymer and at least one carbonyl-donating compound.

26. A charge generation layer-forming composition according to claim 23, comprising (a) titanyl phthalocyanine pigment;
(b) a solvent selected from the group consisting of tetrahydrofuran, 2-butanone, cyclohexanone, and mixtures thereof; and (c) a binder blend comprising polyvinylbutyral and a cyclic carbonate polymer in a weight ratio of polyvinylbutyral to cyclic carbonate polymer of from about 75:25 to about 25:75; wherein the cyclic carbonate polymer is prepared by reacting a hydroxy-containing polymer comprising poly(p-octylphenolformaldehyde), poly(vinylbutyral-vinylalcohol-vinylacetate), poly(bisphenol-A-co-formaldehyde), poly(bisphenol-A-co-formaldehyde-co-butylphenol), or mixtures thereof, with triphosgene.

27. A binder blend comprising at lease one cyclic carbonate polymer and a second binder which is other than a cyclic carbonate polymer.

28. A binder blend according to claim 27, wherein the second binder is polyvinylbutyral.

29. A binder blend according to claim 27, wherein cyclic carbonate polymer is prepared by reacting at least one hydroxy-containing polymer and at least one carbonyl-donating compound.

30. A binder blend according to claim 29, wherein the hydroxy-containing polymer comprises poly(p-octylphenolformaldehyde), poly(vinylbutyral-vinylalcohol-vinylacetate), poly(bisphenol-A-co-formaldehyde), poly(bisphenol-A-co-formaldehyde-co-butylphenol), or mixtures thereof, and the carbonyl-donating compound comprises triphosgene.

* * * * *